June 9, 1936. E. J. OHLIGER, JR 2,043,516
BRAKE OPERATING MECHANISM
Filed June 20, 1932 2 Sheets-Sheet 1
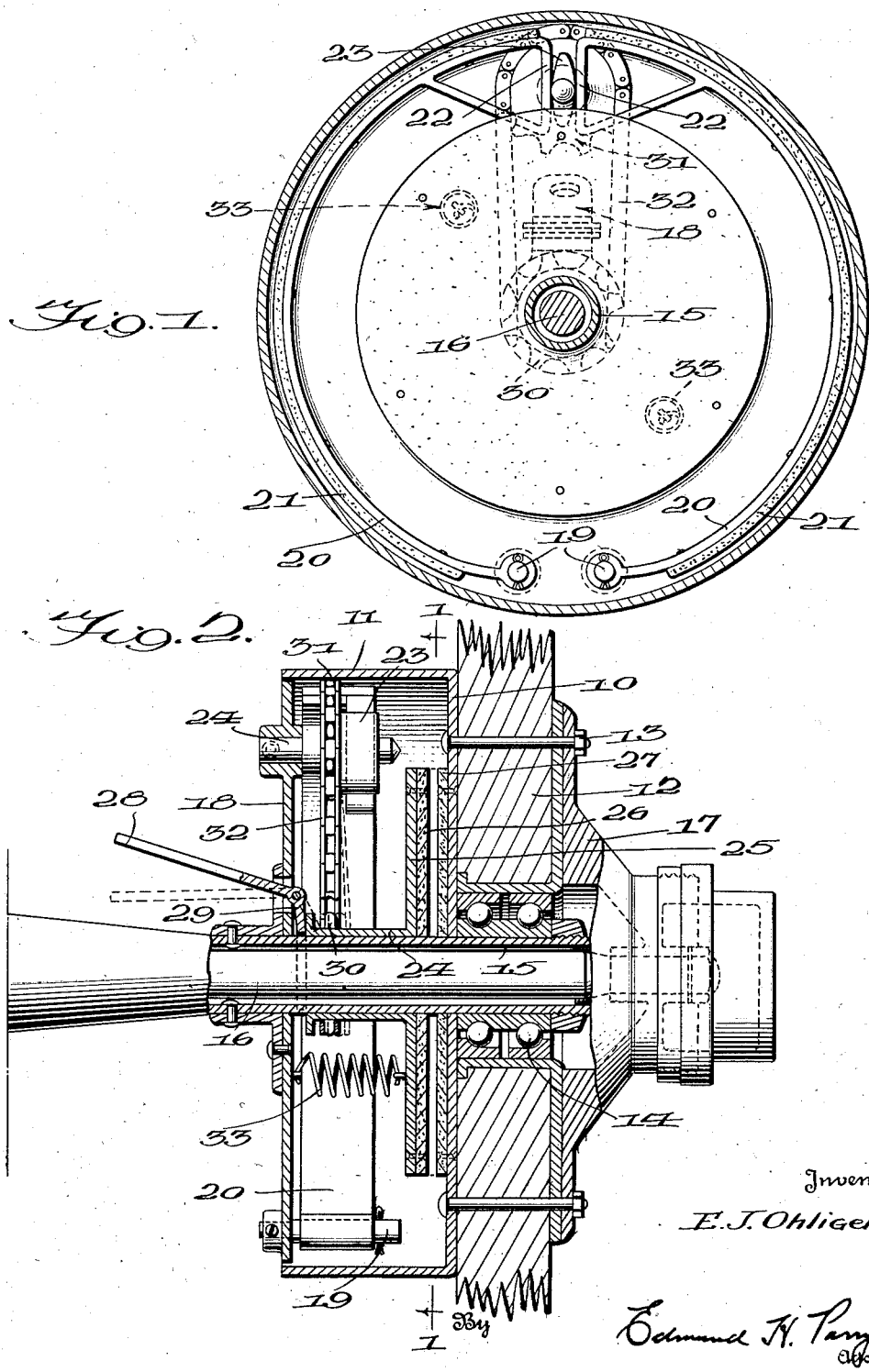

Inventor
E. J. Ohliger, Jr.

Patented June 9, 1936

2,043,516

UNITED STATES PATENT OFFICE 2,043,516

BRAKE OPERATING MECHANISM

Ernest J. Ohliger, Jr., Mount Vernon, N. Y.

Application June 20, 1932, Serial No. 618,330

8 Claims. (Cl. 188—140)

This invention relates to a brake and more in particular to an improvement in automobile brakes in which the motion of the vehicle is utilized to apply the brakes.

For a long time the force for applying brakes on an automobile or similar vehicle was derived through pressure applied on a foot pedal or a hand lever. Only recently have there been provided the so-called booster brakes which make use of the motion of the vehicle for applying the braking action to the wheels. My invention comprises an improvement upon this last type of brake.

An object of my invention is to provide a braking mechanism for automobiles or the like actuatable by a pedal or lever in which the motion of the vehicle is utilized to apply the brakes.

Another object is the provision of a braking mechanism of the expanding shoe type in which the shoes need no adjustment, even after considerable wear, in order to make them coact properly with the brake drum at all times.

Another object is to provide a power brake of the expanding shoe type in which the motion of the vehicle produces the braking force.

Still another object of this invention is to provide a brake having the above qualities and merits which can economically and readily be applied to any of the conventional expanding brakes now in use without any undue cost or expenditure of time.

In the accompanying drawings I have shown my invention illustrated in the preferred forms from which the above and other objects and advantages incident thereto may be readily seen and understood in the light of the following specification.

Fig. 1 is a front plan view of one form of my invention, with a portion of the brake drum removed;

Fig. 2 is a cross-sectional view of the same, taken along the axis of the axle;

Figure 3:
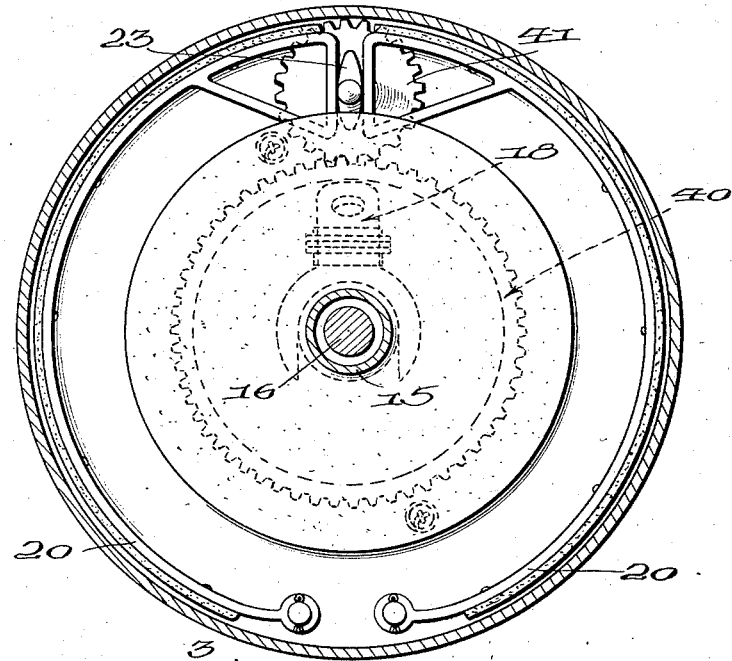
Fig. 3 is a plan view, similar to Fig. 1, showing a modified form of the invention.

Referring now to the drawings in which similar reference numerals designate corresponding parts throughout the several views, a brake drum of a conventional type is shown, the same comprising a radial portion 10 and a peripheral braking flange portion 11. The drum is secured to a wheel, generally designated by the numeral 12, in any suitable manner as by means of the bolts 13. The wheel may be mounted on bearings 14 on an axle support 15. If the wheel is to be driven the axial member 15 may comprise a hollow housing through which extends a drive shaft or axle 16 which is positively connected to the wheel as through the wheel hub 17.

Secured to the axial member 15 in spaced relation with the radial portion 10 of the brake drum is a circular closure plate 18 which pivotally supports through pins 19—19 a pair of internally expanding brake shoes 20—20 with which are associated frictional linings 21—21 adapted to engage the inner face of the flange 11 of the brake drum. In order that the braking area may be as great as possible the pivot pins 19—19 for the respective brake shoes are located in closely spaced relation and the brake shoes extend therefrom around to substantially diametrically opposite points and are there provided with opposing cam surfaces 22—22. Disposed between the cam surfaces of the brake shoes is a cam 23 carried by a stub shaft 24, rotatably supported by the closure plate 18. Rotation of the cam 23 will cause the same to bear upon the opposing cam faces 22—22 of the brake shoes and thereby cause the latter to move into frictional engagement with the inner periphery of the flange of the brake drum.

The structure so far described is conventional. Such type of device has been customarily actuated through foot pressure which caused actuation of the cam through a suitable system of rods and cranks. I will now describe my invention as applied to such a construction, the same permitting the brake to be operated through power produced by the rotation of the wheel and the brake drum.

Disposed within the brake drum is a revoluble member adapted to move axially into frictional engagement with the drum. Preferably such member comprises a sleeve 24 freely supported on the axial member 15 and adapted to rotate and move axially thereof. Associated with the sleeve is a radially extending member 25, the same preferably constituting a flat disc formed as a flange on the sleeve 24. The radial face 10 of the brake drum in the region of the clutching surface or disc 25 should constitute an unbroken flat surface so that the disc may be brought into frictional engagement therewith. In order to insure a powerful application of the brake through mechanism hereinafter to be described, the disc and the coacting surface of the brake drum should be relatively large, extending from the axial member 15 outwardly a distance considerably removed from the latter.

As above pointed out, the sleeve 24 carrying the disc 25 is both rotatable and slidable with respect to the axial member 15, it being intended that the disc be moved axially into engagement with the radial face of the brake drum. The active side of the disc 25 is provided with a frictional facing 26 and, while not absolutely essential, it may also be desirable to provide the coacting surface of the radial face 10 of the drum with a similar frictional facing 27. Any suitable means to cause the sleeve 24 to move axially to bring the disc 25 into engagement with the brake drum may be utilized, such, for example, as the pivoted lever 28 having a portion 29 adapted to bear against the end of the sleeve 24. The lever 28 or any equivalent element will be connected with the usual brake pedal or lever of the vehicle so that engagement of the disc with the brake drum can be manually controlled.

To render the mechanism so far described operative to actuate the brake shoes, suitable means may be provided between the rotatable member and the cam 23 of such character that when the disc 25 is brought into engagement with the radial face of the brake drum and caused to rotate thereby, the latter motion may be transmitted to the cam which in turn will expand the brake shoes. The actuating means should be positive in operation, comprise a minimum of parts, and be of such a nature as not to require any reorganization of the general brake structure conventionally used.

In the embodiment of my invention shown in Figs. 1 and 2, the actuating mechanism comprises a sprocket gear 30 secured to and rotatable with the sleeve 24 and a similar sprocket gear 31 rotatable with the brake-engaging cam 23 on the shaft 24, such gears being connected through a sprocket chain 32. The sleeve 24 is, of course, slidable axially on the axle member 15, so that the gears 30 and 31 will not at all times be in alignment. However, the movement of the sleeve 24 to bring the disc 25 into frictional engagement with the radial face of the brake drum is relatively small so that the sprocket chain being flexible will enable the motion of the disc and the sleeve to be transmitted through the gears 30 and 31 to the brake cam 23, even though the gears are not in alignment.

To maintain the braking disc 25 normally out of engagement with the brake drum, resilient means such as the springs 33 are provided. Such springs connect with the disc 25 and may at their opposite ends be secured to the cover plate 18. The purpose of the resilient means is not only to maintain the disc 25 out of engagement with the brake drum, but also to return the same to disengaged position after the same has been operative to set the brake shoes. To prevent the disc 25 from freezing in frictional engagement with the brake drum, the springs should be secured to the disc or other parts of the revoluble member in such manner as to be distended by the rotative motion of the disc. Thus, the springs may be disposed axially between the disc and the cover plate. With such an arrangement when the pressure applied through the lever 28 to move the revoluble member axially is released, the springs will contract and cause the disc to move axially out of engagement accompanied by a slight rotative movement as the springs contract and assume their normal position.

Figure 4:
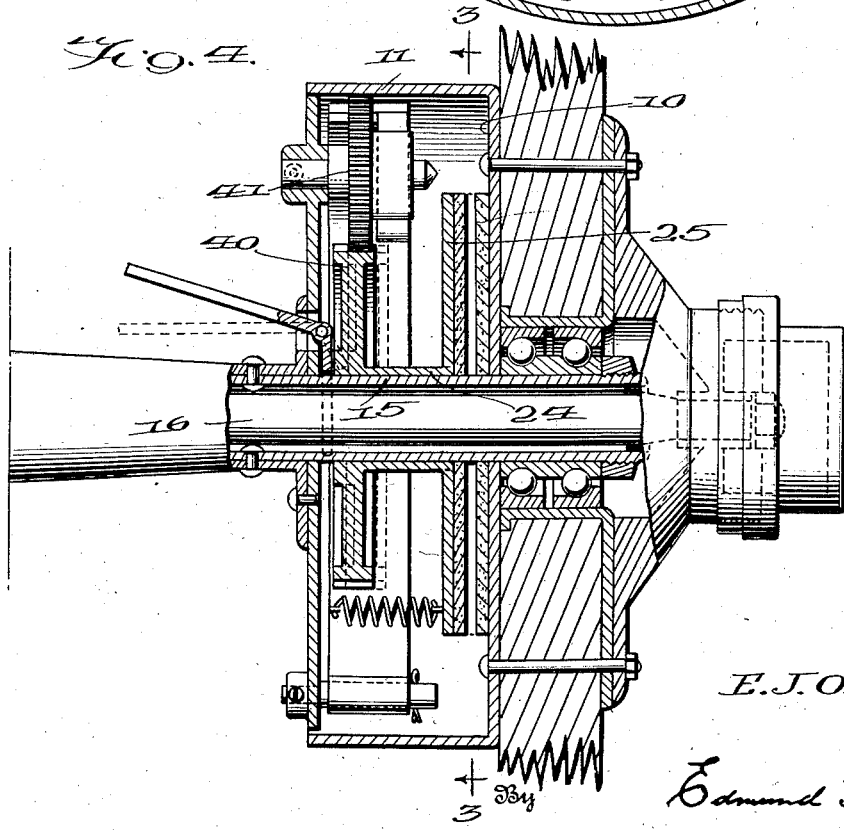
Fig. 4 is a cross-sectional view corresponding to Fig. 2 showing the modified form.

Instead of using a flexible chain, such as above described to actuate the brake cam when the revoluble member engages the brake drum and is rotated thereby, an equivalent actuating mechanism such as shown in Figs. 3 and 4 may be resorted to. In this embodiment of my invention the construction and operation of the revoluble member including the sleeve 24 and the disc 25 is the same as that above described as are the main parts of the brake structure. As a substitute for the chain and sprocket mechanism between the sleeve 24 and the cam 23, I provide a positive gear connection, the same comprising a gear 40 secured to and rotatable with the sleeve 24, and a gear 41 rotatable with the cam 23 and in meshing engagement with the gear 40. In order that the power developed by engagement of the disc 25 with the brake drum may be utilized to best advantage in setting the brake shoes, it is desirable that the diameter of the gear 40 be large in proportion to the diameter of the cam gear 41. By reason of the fact that the gear 40 moves axially with the sleeve 24, the same should be made relatively wide so as to intermesh with the gear 41 under all conditions.

It will be appreciated that the present invention provides a simple and effective means whereby the rotation of a wheel and the brake drum thereon may be used under manual control to set the brake shoes. The same is readily applicable to conventional brake structures without a reorganization of the parts customarily used therein. Furthermore, since the mechanism of my invention, as illustrated in the two embodiments shown in the drawings, is relatively simple and comprises only a few working parts, the invention may be installed at a relatively nominal cost. Since the revoluble member upon engagement with the brake drum will be rotated thereby until the brake shoes are firmly set, it will be appreciated that no adjustment of the brake shoes or of the pedal control mechanism will be necessary even when the brake shoes become worn. The pedal control will be moved the same distance under all conditions since the same serves only to throw the revoluble member into engagement with the brake drum and has no connection with the brake shoes. By reason of the construction of my invention, the same will be operative to apply the brakes regardless of the direction of rotation of the brake drum and wheel. Thus, the same is equally effective to apply the brakes when the vehicle is moving forward or backward.

What I claim is:

1. A brake comprising a drum, brake shoes engageable with the drum, a revoluble member disposed within the drum and adapted to move axially into frictional engagement with the drum, a cam engageable with the brake shoes, and an endless flexible member between the revoluble member and the cam operable upon rotation of the revoluble member to cause the cam to set the brake shoes.

2. A brake comprising a drum, brake shoes engageable with the drum, a revoluble member disposed within the drum and adapted to move axially into frictional engagement with the drum, a cam engageable with the brake shoes, and means including an endless chain connecting the revoluble member and the cam operable upon rotation of the revoluble member to cause the cam to set the brake shoes.

3. A brake comprising a drum having a radially extending clutching surface and an axially extending braking flange, brake shoes engageable with the brake flange, an axle member extending into said drum, a sleeve shiftably and rotatably mounted on said axle member having a braking disc integral therewith for engagement with the major portion of said radially extending clutching surface, a cam for spreading the brake shoes, and constantly intermeshing gears of different thickness connecting with said sleeve and cam, one of said gears being shiftable with said sleeve and operable upon the rotation of the sleeve for spreading the brake shoes.

4. A brake comprising a drum having a radial friction face and a peripheral flange, brake shoes engageable with the drum flange, an axle member, a cover plate for the drum carried by the axle member, a pin mounted on said plate carrying a cam engageable with the brake shoes, a revoluble member disposed within the drum and adapted to move axially into frictional engagement with the radial drum surface and constantly intermeshing gears of different thickness one carried by said pin and the other by said revoluble member and axially movable therewith and operable upon rotation of the revoluble member to cause the cam to set the brake shoes.

5. A brake comprising a drum having a radially extending friction surface and an axially extending braking flange, brake shoes engageable with said flange, a cover plate for said drum and a pin mounted thereon carrying a cam to spread said brake shoes, a gear keyed to said pin, a member extending axially into said drum, a sleeve rotatably and shiftably mounted thereon having integral therewith a gear and a flange presenting a braking disc for engaging the radially extending friction surface of said drum, said gear being constantly in mesh with the gear on said pin for turning the same and said cam to set the brake shoes when the sleeve is rotated through the contact of the brake disc with the radially extending friction surface of the drum.

6. A brake comprising a drum having a radial face and a peripheral flange, a closure plate covering the open side of the drum, brake shoes engageable with the peripheral flange of the drum, a revoluble member disposed within the drum and adapted to move axially into frictional engagement with the radial face of the drum, means operable upon rotation of the revoluble member to set the brake shoes, a plurality of short springs having a fixed support and connected to the revoluble member, said springs being adapted to normally hold the revoluble member out of engagement with the radial face of the drum and also serving to return the same to normal position after engagement with the drum.

7. A brake comprising a drum having a radial face and a peripheral flange, a closure plate covering the inner side of the drum, brake shoes engageable with the peripheral flange of the drum, a revoluble member having a friction face disposed within the drum and adapted to move axially to bring said face into frictional engagement with the radial face of the drum, a cam engageable with the brake shoes, being rotatable in one direction to set the shoes and rotatable in the other direction to release the shoes, positive reversely operating driving means interconnecting the revoluble member and rotatable brake cam providing for axial movement of the revoluble member relative to said cam to and away from engagement with the radial drum face, said driving means being operative by rotation of the revoluble member in one direction under engagement of said member with the drum to rotate the brake cam to set the brake shoes, said driving means also being operative through rotation of the revoluble member in the opposite direction reverse to the rotation of the drum after release from the drum to reversely rotate the cam to release the brake shoes, and means for releasing the revoluble member from engagement with the drum and for rotating the same in a direction reverse to the rotation of the drum.

8. A brake comprising a drum having a radial face and a peripheral braking flange, brake shoes engageable with the peripheral flange, an axle member extending through the drum, a sleeve rotatable on the axle and mounted for movement longitudinally thereon, a pair of opposing discs, secured one to the radial face of the drum and the other to the rotatable sleeve and presenting uninterrupted flat surface areas adapted to frictional clutching engagement with each other, and each having central openings adapted to snugly receive the axle members, means for moving the sleeve longitudinally to bring the disc secured thereto into clutching engagement with the disc on the drum, and means responsive to the clutching engagement between said discs to set the brake shoes.

ERNEST J. OHLIGER, Jr.